W. F. TOBIN.
GROUND KEY COCK.
APPLICATION FILED MAY 31, 1916.
1,202,004.
Patented Oct. 17, 1916.
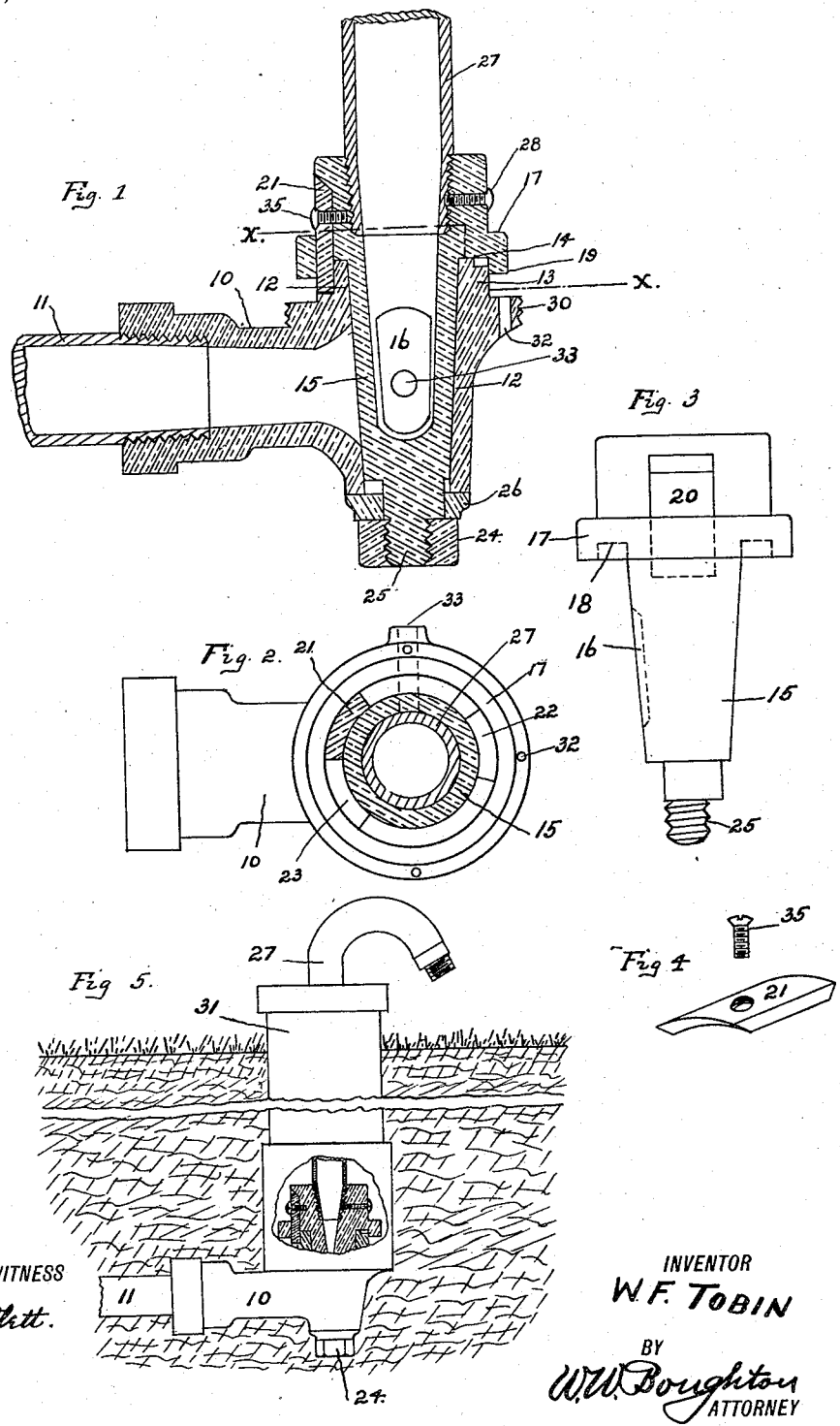
WITNESS
F. J. Bartlett.
INVENTOR
W. F. TOBIN
BY
W. W. Boughton
ATTORNEY

UNITED STATES PATENT OFFICE.

WILLIAM F. TOBIN, OF PUEBLO, COLORADO.

GROUND KEY-COCK.

1,202,004.  Specification of Letters Patent.  Patented Oct. 17, 1916.

Application filed May 31, 1916. Serial No. 100,752.

*To all whom it may concern:*

Be it known that I, WILLIAM F. TOBIN, a citizen of the United States, and a resident of Pueblo, in the county of Pueblo and State of Colorado, have invented a certain new and useful Improvement in Ground Key-Cocks, of which the following is a full, clear, and exact description.

This invention is an improvement in ground key cocks and its principal object is the provision of a construction in which a large portion of any shocks or blows delivered to the plug key operating means may be transmitted to and absorbed by the cock body instead of reaching the tapered plug key and setting or jamming the same. To this end I provide the plug key with a thrust bearing adapted to bear against a collar on the cock body, the plug being so ground that the fit of the plug on its tapered engaging seats is simultaneous with the engagement of said thrust bearing. Thus if a blow be given the plug actuating means in a direction longitudinal thereof the major portion of said blow will be absorbed by the thrust bearing and can not serve to set the plug key in its tapered seats.

As a secondary object aiding in carrying out the primary one, my invention also comprises a structure in which the fit of the plug key on its tapered seats may be ground under the observation of the operator until the contact of the transverse thrust bearing is perfect—the grinding of the plug and its seats being stopped at precisely this point. After the grinding is complete a detachable stop, whose absence permitted the operator to watch the approach of the thrust bearings to engagement, is secured in place and entrance of foreign substances to said bearing is prevented.

Further objects and advantages of my invention will later appear in this specification.

In the drawings and description I have illustrated my invention as applied to a hydrant cock but it will be evident that certain features of the construction involved are also applicable to ground plug cocks of other types and I do not wish, therefore, to be considered as limited to cocks of the type chosen for illustration.

In the single sheet of drawings accompanying this application and forming a part hereof Figure 1 is a central sectional view though a hydrant cock involving my invention; Fig. 2 is a section through the device shown in Fig. 1 on the line X—X of said figure; Fig. 3 is a side elevation of the plug key on a slightly enlarged scale; Fig. 4 is a perspective view of the detachable plug section which also constitutes the cock stop; and Fig. 5 is a side view of a complete hydrant cock and connections installed, a portion of the figure being broken away to shorten its vertical dimensions.

Referring to the drawings, let 10 indicate the inlet connection of a hydrant cock into which the service pipe 11 is adapted to be threaded. The inlet connection leads into the cock body which is provided with a plug key chamber 12, disposed at right angles to said inlet connection, the chamber 12 having tapered seats for engagement with a similarly tapered ground key plug 15. On its upper face the cock body has an upstanding collar 13 having a bearing surface 14 on which a corresponding collar on the plug key 15 is adapted to bear. The key plug 15 is hollow and has the port 16 in its wall adapted when the plug key is in proper position to afford communication between the inlet connection 10 and the hollow interior of the plug key. A collar 17 on the plug key 15 is shaped to overlie the collar 13 on the cock body, to have its surface 18 bear on the surface 14 and to have its downwardly projecting rim 19 in rotatable engagement with the outer surface of the cock body.

The plug key 15 is recessed at 20 for the reception of the detachable plug section 21 which, when in position, entirely closes the opening or recess 20 and also serves to engage the lugs 22 and 23, formed as shown on the outer portion of the collar 13, to limit the throw of the plug key 15 to a quarter revolution. A nut 24 fits on the threaded stud 25 on the plug key 15 for holding the plug key and its washer 26 firmly to their seats.

The goose-necked pipe 27 is screwed into the plug key 15 at its open end and is locked therein by the set screw 28, this pipe extending to the surface of the ground as indicated in Fig. 5 and performing the combined functions of serving as a delivery pipe for the water and as a means for turning the plug key to open or close the cock.

The cock body is threaded on its largest diameter at 30 so that a protective casing 31 may be screwed thereon, leakage openings 32 being preferably provided in the cock body adjacent the point of connection with the casing 31 to discharge any water accidentally entering the casing. A drainage opening 33 in the cock body communicates with the port 16 in the plug 15 when the cock is closed to discharge the water remaining in the stand pipe 27.

My device may be conveniently made and assembled as follows: The tapered seating surfaces of the cock body and plug are simultaneously ground by rotating one with relation to the other under the action of a suitable grinding mixture, the plug section 21 not being in place during this operation. Through the opening 20 the operator may conveniently observe the progress of the grinding of the tapering seats until the surface 14 on the cock body and 18 on the plug just arrive at engagement, when the grinding is stopped. Then the plug key is partially slipped from its seats to enable the section 21 to be inserted in its place, the plug key is returned to its seats, and the hole in the plug key for the reception of the retaining screw 35 is tapped. Then the screw 35 for holding the section 21 in place is inserted, the washer 26 and nut 24 are put in place and the nut 24 is turned up to draw the plug key 15 as tightly to its seats as desired.

The plug section 21 acting as a stop permits the plug key to be turned through a quarter revolution to open or close the cock, the lugs 22 and 23 on the cock body determining the range of oscillation of the plug. When the port 16 is turned to permit the flow of water from the pipe 11 into the plug key body the cock is open and water flows up through the combined operating and discharge pipe 27, the opening 33 in the cock body being then closed by the wall of the plug key. If the pipe 27 is turned back to the position illustrated in Fig. 1 the discharge of water through the cock is stopped and any water remaining in the stand pipe 27 is drained out through the ports 16 and 33.

I recognize that the removable section 21 may be secured in place by being dovetailed into its recess instead of being held in place by the set screw 35 or that other equivalent mechanical means may be employed for retaining this element. Also that the relative positions of the removable section 21 and its coöperating stop lugs may be reversed, the removable section being located in the cock body and the corresponding lugs on the rotatable plug. In the latter instance the removable section may, if desired, be inserted in a radial, dovetailed slot in the cock body and be provided with a right angled portion which projects upwardly so that its upper surface may form a bearing surface for the lower face 14 of the collar 17. These and other changes in mechanical details and features of my invention may be made without departing therefrom and I do not wish to be considered as limited to the precise details shown and described but may vary the same within the limits of the appended claims.

Having thus described my invention, what I claim and desire to secure by Letters Patent is:—

1. In a ground key cock, a cock body having tapered seating faces and a thrust bearing surface, a tapered plug key adapted to engage said tapered seating faces and provided with a collar adapted to engage and bear on said thrust bearing surface, one of said elements having an opening therein adapted to expose to view said thrust bearing surfaces, and a detachable section adapted to close said opening.

2. In a ground key cock, a cock body having tapered seating faces and a thrust bearing surface, a tapered plug key adapted to engage said tapered seating faces and provided with a collar adapted to engage and bear on said thrust bearing surface, said plug key having an opening therein adapted to expose to view said thrust bearing surfaces, and a detachable section adapted to close said opening.

3. In a ground key cock, a cock body having tapered seating faces and a collar thereon provided with a thrust bearing surface and with stop engaging lugs, a tapered plug key adapted to engage said tapered seating faces and provided with a collar adapted to engage said thrust bearing surface, said plug key having an opening therein adapted to expose to view said thrust bearing surfaces, and a detachable section adapted to be secured in position to close said opening and to engage said lugs to limit the oscillation of said plug key.

In testimony whereof, I have hereunto affixed my signature.

WILLIAM F. TOBIN.

Copies of this patent may be obtained for five cents each, by addressing the "Commissioner of Patents, Washington, D. C."